Oct. 6, 1942.    E. G. JOHANSSON    2,297,833
DETACHABLE INSTRUMENT SOCKET
Filed April 30, 1941
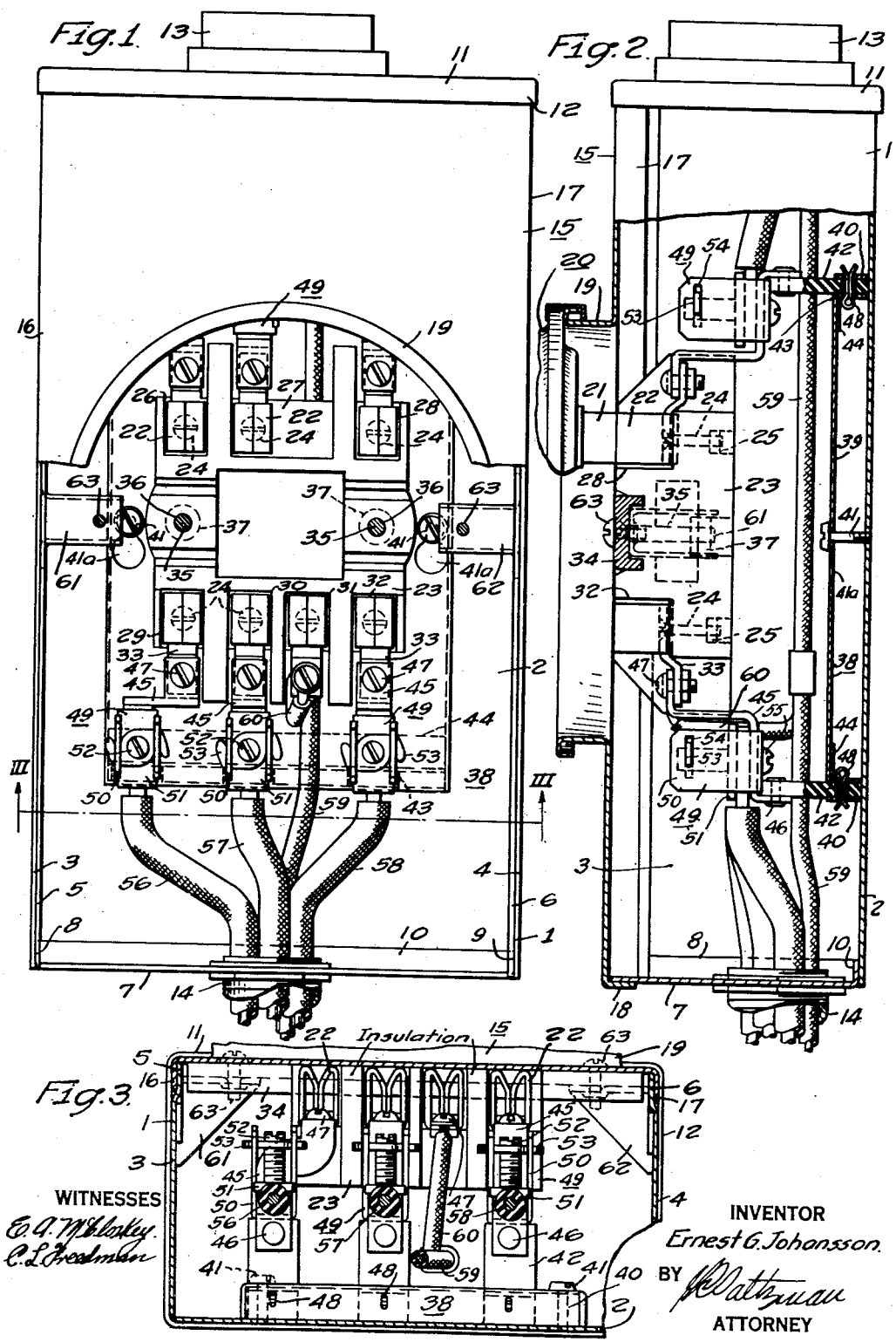
WITNESSES
E. A. McCloskey
C. L. Freedman
INVENTOR
Ernest G. Johansson.
BY
ATTORNEY Patented Oct. 6, 1942

2,297,833

UNITED STATES PATENT OFFICE 2,297,833

DETACHABLE INSTRUMENT SOCKET

Ernest G. Johansson, Watertown, Mass., assignor to Anchor Manufacturing Company, Boston, Mass., a corporation of Massachusetts Application April 30, 1941, Serial No. 391,150

11 Claims. (Cl. 175—222)

This invention relates to electrical instrument installations, and it has particular relation to sockets for receiving electrical instruments of the detachable type.

Because of its inherent advantages the detachable type of construction is widely employed for electrical instruments such as relays, indicating instruments, integrating instruments and recording instruments. As a specific example, the problems encountered in such instruments may be discussed for a watthour meter.

A watthour meter for detachable mounting is provided with a plurality of contact blades which project from the watthour meter casing. A socket for receiving such a watthour meter is provided with an opening for receiving the contact blades. When a watthour meter is in mounted position on the socket, it closes the opening. The socket also contains a plurality of contact jaws for detachably receiving the contact blades of a detachable watthour meter. A detachable watthour meter and socket assembly of this general type is disclosed in the Bradshaw et al. Patent 1,969,499, issued August 7, 1934. This patent discloses a socket of the round type which is particularly suitable for an individually mounted watthour meter having relatively few contact blades. For such service the contact jaws may be permanently mounted in the watthour meter socket.

For watthour meters having a large number of contact blades or designed for heavy current service, it is desirable that sockets be employed having sufficient room for line and load conductors. In order to provide ample conductor room, box and trough constructions have been developed for watthour meter sockets. Such a socket may take the form of a box or trough having a detachable cover section. This cover section is provided with an opening surrounded by a ring flange for receiving a detachable watthour meter. The cover section also carries all contact jaws and terminals required for connecting the contact jaws to service and load conductors. This leaves the base of the box or trough substantially free for service and load conductors.

For many installations, such a box or trough construction is entirely suitable. However, it should be observed that the connections between the service and load conductors and the terminals must be made while the cover section is in place on the associated box or trough. If the contact jaws are few in number and if the service and load conductors are not unduly large, such connections may be effected without great difficulty. However, if the number of contact jaws is large, the opening is so restricted thereby that the connections can be made only with difficulty. Furthermore, in such a construction stresses applied to the terminals during normal operation thereof are applied directly to the insulation provided for the contact jaws. Since this insulation generally is of porcelain, the application of heavy stress thereto is undesirable as such stress tends to fracture the porcelain. A box or trough construction of this general type is disclosed in the Mylius Patent 2,071,936, issued February 23, 1937.

To obviate these difficulties, a construction has been developed wherein the terminals are carried by insulation permanently secured to a box or trough, whereas the contact jaws are carried by insulation attached to the cover section of the box or trough. This permits line and load conductors to be connected to the terminals while the cover section, together with associated contact jaws, are removed from the box and trough. After the load and service connections have been made, and the cover section placed in position on the box or trough, connections between the terminals and contact jaws are effected by means of screw or cam operated connectors. A construction of this type is disclosed in my Patent 2,182,629, issued December 5, 1939. A construction of this type has proven to be extremely serviceable in numerous installations. However, when a watthour meter requires a large number of contact jaws, the cost and complexity of the screw or cam operated connectors render such a construction impracticable.

In accordance with this invention, a contact jaw assembly for a watthour meter or other detachable electrical instrument is flexibly supported in a box or trough. This box or trough is provided with a separate cover section having a ring flange for receiving a watthour meter or detachable instrument. Because of the flexible support, line and load conductors may be connected to the contact jaw assembly while the cover section is removed from the box or trough. The cover section may be placed in position subsequently and attached to the contact jaw assembly by suitable means such as machine screws. The flexibility provided between the box or trough and the contact jaw assembly permits the machine screws or other attaching means to draw the contact jaw assembly into accurate alignment with the ring flange.

In accordance with a further aspect of the invention, the terminals for receiving line and load conductors are supported substantially in the box or trough by means other than the insulation block which carries the contact jaws. Because of this construction the insulation block is relieved of a substantial part of the stress applied to the terminals during normal operation thereof.

It is, therefore, an object of the invention to provide an improved socket for a detachable electrical instrument.

It is a further object of the invention to provide for a detachable electrical instrument, a socket including an enclosure provided with a cover section and having a contact assembly flexibly supported by a portion of the enclosure other than the cover section.

It is a still further object of the invention to provide for a detachable electrical instrument, a socket wherein terminals are supported at least in part by means other than the insulation block for the contact jaws provided for the instrument.

It is another object of the invention to provide a contact jaw sub-assembly wherein contact jaws are flexibly supported on a sub-base which also supports terminals through a path other than the insulation block provided for the contact jaws.

Other objects of the invention will be apparent from the following description taken in conjunction with the accompanying drawing, in which:

Figure 1 is a view in front elevation with parts broken away of a detachable instrument socket embodying the invention;

Fig. 2 is a view in side elevation with parts broken away of the socket illustrated in Fig. 1; and Fig. 3 is a view in cross section taken along the line III—III of Fig. 1.

The drawing shows a box 1 for detachably receiving a detachable electrical instrument, such as a watthour meter. This box 1 includes a U-shaped section which provides a bottom wall 2 and side walls 3 and 4 for the box. The side walls 3 and 4 have inwardly offset edges 5 and 6.

Although the box may be designed for various forms of mounting, the specific box illustrated in the drawing is designed for vertical mounting. The lower end of the box may be closed by a plate 7 having flanges 8, 9 and 10 for engaging, respectively, the walls 3, 4 and 2. Attachment of the plate 7 to the walls of the box may be effected in any suitable manner as by welding, rivets or bolts (not shown). For closing the upper end of the box a weather cap 11 is provided which includes a continuous flange 12 extending around the walls of the box 1. The weather cap 11 may be attached to the walls of the box in a manner analogous to the attachment of the plate 7 thereto.

In order to provide for the entry of line and load conductors into the box 1, suitable knockouts may be provided at any desired positions in the walls of the box. As illustrated in the drawing, the weather cap 12 is provided with a hub 13 for receiving conduit through which conductors may enter the box. In addition, the plate 7 is provided with a conduit 14 through which conductors also may enter the box.

The enclosure provided by the box is completed by a cover section 15 having flanges 16, 17 and 18 for embracing, respectively, the edges 5 and 6 and the plate 7. Preferably the weather cap 11 clears the edges 5 and 6 sufficiently to permit the insertion of the cover section 15 by a sliding movement beneath the flange of the weather cap 11.

By inspection of the drawing it will be observed that the cover section 15 is provided with a ring flange 19 which defines an opening extending through the cover section. This ring flange may be formed in various ways. As illustrated in the drawing, the flange is formed by drawing the metal of the cover section 15 into the desired shape. The various parts of the box thus far described may be constructed of any suitable material such as steel or aluminum.

The ring flange 19 is designed to receive a detachable instrument such as a watthour meter 20. Such a watthour meter carries a plurality of contact blades 21 which project through the opening into the enclosure defined by the box 1. For a further description of the coaction between the watthour meter 20 and the ring flange 19, reference may be made to the aforesaid Bradshaw et al. patent.

For receiving the contact blades 21 of the watthour meter, a plurality of contact jaws 22 are positioned within the box. The number of contact blades and contact jaws required depends upon the specific detachable instrument selected and the connections to be made thereto. For the purpose of discussion, it will be assumed that the specific watthour meter 20 disclosed in the drawing has seven contact blades 21 and requires seven contact jaws 22.

Because of the large number of contact jaws and the small spacing therebetween, it is desirable that they be maintained in accurate alignment with each other and with the ring flange 19 for the purpose of accurately receiving the contact blades 21. Moreover, it is desirable that the insulation provided between the various contact jaws be of good quality.

In order to assure proper alignment of the contact jaws it is convenient to employ a single insulation block 23 for supporting all contact jaws. Attachment of the contact jaws to the insulation block may be effected by machine screws 24 which pass through the contact jaws and are received in threaded bushings 25 positioned in the insulation block 23. In addition, the machine screw 24 serves to attach an electroconductive strap 33 to each contact jaw. These straps may be employed for the purpose of establishing electrical connections to the contact jaws. As shown in the drawing, the insulation block 23 is provided with a plurality of pockets 26 to 32, each of which contains one contact jaw.

Alignment of the contact jaws relative to the ring flange 19 is further facilitated by the attachment of the insulation block 23 to a bridge bar 34. This bridge bar is attached in any suitable manner to the cover section 15 and extends diametrically across the opening formed by the ring flange 19. The bridge bar may be attached to the insulation block 23 by means of machine screws 35 which extend through openings in the bridge bar and openings 36 in the insulation block 23 to engage threaded bushings 37 disposed in the insulation block 23. It will be noted from an inspection of Fig. 2 that the bridge bar 34 has substantially a channel cross section which fits in a corresponding recess in the insulation block 23 to position accurately the insulation block.

As previously indicated, an insulation block of the size shown in the drawing occupies so great a proportion of the space available within the ring flange 19 that it is difficult to establish connections to the contact jaws with the cover section 15 in place. In order to permit such connections to the contact jaws to be made with the cover section removed, an auxiliary supporting structure is provided for the insulating block 23 and the contact jaws 22. This supporting structure includes a base structure 38 which preferably is detachably fixed to a portion of the box other than the cover section 15. In the specific embodiment herein disclosed, the base structure 38 is in the form of a plate 39 having a continuous wall 40 formed around its periphery to space the plate 39 from the wall 2 of the box. Attachment of the base structure to the wall 2 is effected by machine screws 41 which are received in threaded openings provided in the wall 2.

To facilitate attachment and detachment of the base structure 38 relative to the wall 2, one or more keyhole slots 41a are provided in the plate 39. Each keyhole slot is so formed that the head of the machine screw 41 will pass through the enlarged portion of the keyhole slot but not through the narrow portion thereof. The body of each machine screw 41 is sufficiently small in diameter to be received in the narrow portion of the keyhole slot. Consequently by loosening the machine screws 41 slightly and sliding the base structure 38 upward, as viewed in Figs. 1 and 2, the base structure may be withdrawn readily from the box 1. By reversing the procedure, the base structure may be easily attached to the wall 2 of the box.

Part of the means for attaching the insulation block 23 to the base structure 38 includes one or more insulating strips 42. Each insulation strip preferably is received in a non-circular opening provided in the plate 39 for the purpose of preventing relative rotation therebetween. The reason for such construction will be pointed out more particularly below. In the specific embodiment herein disclosed, six insulating strips 42 are provided each having an elongated or rectangular cross section for reception in elongated or rectangular openings 43 provided in the plate 39. In order to restrict undue movement of the insulating strips 42, the plate 39 may have attached thereto in any suitable manner, as by welding, angles 44 which cooperate with the walls 40 to define a channel for receiving each of the insulating strips.

A relatively rigid strap 45 is provided for connecting each of the insulating strips 42 to one of the straps 33. This attachment may be effected in any suitable manner. As illustrated, one end of each strap 45 is connected to one of the insulating strips 42 by means of a rivet 46. The remaining end of each strap 34 is connected to the associated strap 33 by means of a bolt 47.

From the description thus far presented, it is clear that the insulation block 23 is supported on the base structure 38 by means of a plurality of links, each of which includes one of the straps 33, one of the straps 45 and one of the insulation strips 42. To complete the connection of the insulation block to the base structure 38, each insulation strip may be connected in any suitable manner to the base structure. In a preferred form of the invention, a cotter pin 48 may be employed for this purpose. As clearly shown in Fig. 2, each cotter pin extends through one flange of the angle 44, an opening provided in the insulation strip 42 and the wall 40. Preferably the opening through the insulation strip 42 or the openings through the angle and wall are large enough to permit substantial movement between the insulation strips 42 and the base structure 38. This is for the purpose of facilitating alignment of the insulation block 23 relative to the bridge bar 34 and the ring flange 19 when the machine screws 35 are inserted in place. If desired, a slight amount of play may be left between the insulation strip 42 and the faces of the channel formed by the angle 44 and the wall 40 to facilitate further the alignment of the insulation block 23.

To facilitate connections between service and load conductors and the contact jaws, a plurality of terminals 49 are provided. These terminals may vary appreciably in construction but in the specific embodiment herein illustrated, each terminal includes a U-shaped clip 50 having parallel side walls designed to guide a clamping plate 51 mounted for reciprocation therein. This clamping plate has rotatably attached thereto a screw 52 which is received in a threaded opening provided in a bar 53 having ears extending through slots 54 provided in the side walls of the clip 50. Each screw 52 is attached to its associated clamping plate 51 by a connection which permits rotation of the screw relative to the plate but prevents actual movement of the screw relative to the plate. Consequently rotation of the screw 52 serves to move the clamping plate into or out of engagement with a conductor inserted between the clamping plate and the base of the U-shaped clip 50. Another form of terminal which may be employed is illustrated in the aforesaid Mylius patent.

In the prior art, terminals have been attached to the insulation block of a watthour meter socket. This insulation block generally is formed of porcelain in order to provide adequate insulation between the contact jaws. The attachment of a terminal directly to the porcelain is objectionable in many cases for the reason that stress applied to the terminal during normally operation thereof is transmitted directly to the porcelain. Under the influence of this stress, the porcelain may fracture. Such action is aggravated as the size of terminal and the size of conductor to be attached to the terminal increase. For these reasons, the terminals 49 are so supported that a substantial part of the stress to which they are subjected is transmitted to the base structure 38 without passing through the porcelain insulation block 23.

In the specific embodiment illustrated, each of the terminals 49 is attached to one of the straps 45 in any suitable manner as by means of a machine screw 55 which engages a threaded opening in the strap 45. By positioning each terminal adjacent one of the insulating strips 42, a substantial part of the stress resulting from the application of torque to the screws 52 is transmitted directly to the insulation strips 42 without injuriously effecting the insulation block 23. Because of the non-circular or rectangular cross section of the insulation strips 42, the insulation strips serve as excellent anchors during rotation of the screws 52.

Although the three insulation strips at each end of the base structure 38 may be replaced by a single insulation strip, it has been found that the construction illustrated has certain advantages from cost and convenience standpoints. Preferably as much space as possible between the insulation block 23 and the wall 2 is left unobstructed to facilitate wiring operations. For example, let it be assumed that the watthour meter 20 is designed to measure energy flowing in a four-wire three-phase circuit. As shown in Fig. 1, the three main conductors 56, 57 and 58 which may be load conductors are attached to the lower terminals 49. Because of the space available between the insulation strips 42, the neutral conductor 59 may be led directly between these insulation strips and may be connected to the voltage contact jaw 31 through a suitable connector 60. The construction illustrated in the drawing provides a separate insulating strip 42 for each of the main conductors 56, 57 and 58. Similar connections for the service conductors may be made to the upper terminals 49. Since the main conductors which carry substantial current are large and require appreciable contact pressure, the insulation strips 42 are desirable for absorbing the resulting stresses.

It is believed that the insulation of the box herein disclosed is apparent from the foregoing description. With the cover section 15 removed, the box is mounted in its desired position. If the insulation block 23 and base structure 38 are not already removed, the screws 41 are released sufficiently to permit the base structure 38 to be lifted and removed over the heads of the screws 41. Since the entire assembly including the insulation block 23 and the base structure 38 are removed, the main conductors 56, 57 and 58, together with the corresponding conductors at the upper end of the box, may be inserted readily. The assembly, including the insulation block 23 and the base structure 38, then may be attached to the wall 2 by means of the screws 41. If desired, however, the assembly may be left in place during the wiring operations.

With the assembly including the insulation block 23 in place, the conductors 56, 57, 58 and 59, together with the associated conductors at the upper end of the box, are attached to the appropriate terminals. During this operation, a substantial portion of the stress applied to the terminals is taken by the insulation strips 42 rather than by the insulation block 23. Since the insulation strips 42 may be formed of a sturdy insulation material, such as a phenol condensation product, they may be designed readily to withstand such stress.

The wiring having been completed, the cover section 15 is inserted in place and the machine screws 35 are inserted to bring the insulation block 23 into accurate alignment with the bridge bar 34 and the ring flange 19. During this operation, the flexible connection provided by the insulation strips 42 permits the insulation block 23 to move slightly, if necessary, in order to align itself with the cover section.

Generally, some form of attachment for the cover section to the box is provided. This attachment may take the form of a pair of brackets 61 and 62 which may be attached to the side walls 3 and 4 in any suitable manner as by welding. These brackets extend beneath the bridge bar 34 to receive machine screws 63 extending through the bridge bar into threaded openings provided in the brackets. Preferably the heads of screws 63 are positioned within the opening defined by the ring flange 19.

Since the invention is susceptible to numerous modifications, the invention is to be restricted only by the appended claims.

I claim as my invention:

1. In a device for detachably receiving a detachable electrical instrument of the type having externally accessible first contact means, an enclosure having a cover section, a supporting structure positioned within said enclosure and attached to a portion of said enclosure separate from said cover section, said supporting structure including first insulating means, second insulating means, second contact means carried by said second insulating means for detachably receiving the first contact means of a detachable instrument, and means for attaching said second insulating means to said first insulating means for supporting said second insulating means substantially in its normal position independently of said cover section.

2. In a device for detachably receiving a detachable electrical instrument of the type having externally accessible first contact means, an enclosure having a cover section, a supporting structure positioned within said enclosure and attached to a portion of said enclosure separate from said cover section, said supporting structure including first insulating means, second insulating means, second contact means carried by said second insulating means for detachably receiving the first contact means of a detachable instrument, means for attaching said second insulating means to said first insulating means for supporting said second insulating means substantially in its normal position independently of said cover section, and means for attaching said cover section to said second insulating means, said supporting structure being designed to permit substantial movement of said second insulating means relative to said enclosure for facilitating alignment of said second contact means with said cover section.

3. In a device for detachably receiving a detachable electrical instrument of the type having externally accessible first contact means, an enclosure having a cover section, a supporting structure positioned within said enclosure and attached to a portion of said enclosure separate from said cover section, said supporting structure including first insulating means, second insulating means, second contact means carried by said second insulating means for detachably receiving the first contact means of a detachable instrument, means for attaching said second insulating means to said first insulating means for supporting said second insulating means substantially in its normal position independently of said cover section, and terminal means supported in substantial part by said supporting structure, said supporting structure being designed to absorb a substantial part of the stress applied to said terminal means during normal operation of said terminal means.

4. In a device for detachably receiving a detachable element instrument of the type having externally accessible first contact means, an enclosure having a cover section provided with an opening for giving access to said enclosure, a supporting structure positioned within said enclosure, means detachably fixing said supporting structure to a portion of said enclosure separate from said cover section, said supporting structure including first insulating means, second insulating means, second contact means adjacent the opening in said cover section and carried by said second insulating means for detachably receiving the first contact means of a detachable instrument when said first contact means are inserted through said opening, and means for attaching said second insulating means to said first insulating means for supporting said second insulating means substantially in its normal position independently of said cover section.

5. In a device for detachably receiving a detachable electrical instrument of the type having externally projecting contact blades, an enclosure including a separate cover section, said cover section having an opening therein designed to be closed by a detachable electrical instrument, insulating means positioned within said enclosure, contact jaws carried by said insulating means for detachably receiving the contact blades of a detachable electrical instrument positioned over said opening, means for attaching said insulating means to said cover section to assure alignment of said contact jaws relative to said opening, supporting means for supporting said insulating means independently of said cover section, said supporting means including a base structure, means for attaching said base structure to a portion of said enclosure separate from said cover section, and means for flexibly attaching said insulating means to said base structure to permit sufficient relative movement therebetween for alignment of said insulating means relative to said opening, and terminal means attached to said supporting means for transmitting directly to said supporting means a substantial part of the stress developed during normal operation of said terminal means, whereby said insulating means is substantially relieved of said stress.

6. In a device for detachably receiving a detachable electrical instrument of the type having externally projecting contact blades, an enclosure including a separate cover section, said cover section having an opening therein designed to be closed by a detachable electrical instrument, first insulating means positioned within said enclosure, contact jaws carried by said first insulating means for detachably receiving the contact blades of a detachable electrical instrument positioned over said opening, means for attaching said first insulating means to said cover section to assure alignment of said contact jaws to relative to said opening, supporting means for supporting said first insulating means independently of said cover section, said supporting means including a base structure, means for attaching said base structure to a portion of said enclosure separate from said cover section, second insulating means flexibly attached to said base structure, and conductive connecting means extending between said contact jaws and said second insulating means for supporting said first insulating means on said second insulating means.

7. In a device for detachably receiving a detachable electrical instrument of the type having externally projecting contact blades, an enclosure including a separate cover section, said cover section having an opening therein designed to be closed by a detachable electrical instrument, first insulating means positioned within said enclosure, contact jaws carried by said first insulating means for detachably receiving the contact blades of a detachably electrical instrument positioned over said opening, means for attaching said first insulating means to said cover section to assure alignment of said contact jaws relative to said opening, supporting means for supporting said first insulating means independently of said cover section, said supporting means including a base structure, means for attaching said base structure to a portion of said enclosure separate from said cover section, second insulating means flexibly attached to said base structure, and conductive connecting means extending between said contact jaws and said second insulating means for supporting said first insulating means on said second insulating means, and terminal means connected to said conductive connecting means for receiving conductors to be conductively connected to said contact jaws, said terminal means being positioned to transmit a substantial part of the stress developed during normal operation thereof to said base structure by a path other than said first insulating means.

8. In a device for detachably receiving a detachable electrical instrument of the type having externally projecting contact blades, an enclosure including a separate cover section, said cover section having an opening therein designed to be closed by a detachable electrical instrument, insulating means positioned within said enclosure, contact jaws carried by said insulating means for detachably receiving the contact blades of a detachable electrical instrument positioned over said opening, means for attaching said insulating means to said cover section to assure alignment of said contact jaws relative to said opening, supporting means for supporting said insulating means independently of said cover section, said supporting means including a base structure having a plurality of spaced non-circular openings therein, means for detachably fastening said base structure to a portion of said enclosure separate from said cover section, a plurality of insulating strips extending into said non-circular openings and having peripheries fitting said openings to prevent substantial rotation of said insulating strips in said openings, means flexibly attaching said insulating strips to said base structure to permit substantial relative movement therebetween to facilitate alignment of said insulating means and said contact jaws relative to said cover section, and means for positioning said insulating means on said insulating strips whereby said insulating means is supported on said base structure.

9. In a device for detachably receiving a detachable electrical instrument of the type having externally projecting contact blades, an enclosure including a separate cover section, said cover section having an opening therein designed to be closed by a detachable electrical instrument, insulating means positioned within said enclosure, contact jaws carried by said insulating means for detachably receiving the contact blades of a detachable electrical instrument positioned over said opening, means for attaching said insulating means to said cover section to assure alignment of said contact jaws relative to said opening, supporting means for supporting said insulating means independently of said cover section, said supporting means including a base structure having a plurality of spaced non-circular openings therein, means for detachably fastening said base structure to a portion of said enclosure separate from said cover section, a plurality of insulating strips extending into said non circular openings and having peripheries fitting said openings to prevent substantial rotation of said insulating strips in said openings, means flexibly attaching said insulating strips to said base structure to permit substantial relative movement therebetween to facilitate alignment of said insulating means and said contact jaws relative to said cover section, means for positioning said insulating means on said insulating strips whereby said insulating means is supported on said base structure, and terminal means for receiving conductors to be connected to said contact jaws, said terminal means being positioned to pass stress developed during normal operation thereof to said insulating strips by a path other than said insulating means.

10. In a device for detachably receiving a detachable electrical instrument of the type having externally projecting contact blades, an enclosure including a separate cover section, said cover section having an opening therein designed to be closed by a detachable electrical instrument, insulating means positioned within said enclosure, contact jaws carried by said insulating means for detachably receiving the contact blades of a detachable electrical instrument positioned over said opening, means for attaching said insulating means to said cover section to assure alignment of said contact jaws relative to said opening, supporting means for supporting said insulating means independently of said cover section, said supporting means including a base structure having a plurality of spaced elongated channels therein, means for fastening said base structure to a portion of said enclosure separate from said cover section, a plurality of insulating strips having an elongated cross section inserted in said channels, means for attaching said insulating strips to said base structure, said last-named means permitting movement of said insulating strips relative to said base structure to facilitate alignment of said insulating means relative to said cover section, terminals for detachably receiving conductors to be connected to said contact jaws, means for attaching said terminals with substantial rigidity to said insulating strips, whereby said insulating strips receive a substantial part of the stress applied to said terminals during operation thereof, and conductive means for connecting said terminals to said contact jaws, said conductive means serving to position said insulating means relative to said insulating strips.

11. In a contact jaw assembly for detachable electrical instruments, a base structure, a contact unit including contact jaw means and insulating means for said contact jaw means, supporting means extending between said contact unit and said base structure for flexibly supporting said contact unit on said base structure, terminal means carried by said supporting means, said supporting means including insulating means positioned between said terminal means and said base structure, and conductive means extending between said terminal means and said contact jaws.

ERNEST G. JOHANSSON.